(12) United States Patent
McElvain et al.

(10) Patent No.: US 7,920,293 B2
(45) Date of Patent: Apr. 5, 2011

(54) SYSTEM AND METHOD FOR PATTERNED ENCODED HALFTONING

(75) Inventors: John McElvain, Manhattan Beach, CA (US); Charles Michael Hains, Altadena, CA (US)

(73) Assignee: Xerox Corporation, Norwalk, CT (US)

( * ) Notice: Subject to any disclaimer, the term of this patent is extended or adjusted under 35 U.S.C. 154(b) by 1067 days.

(21) Appl. No.: 11/443,351

(22) Filed: May 31, 2006

(65) Prior Publication Data

US 2007/0279652 A1 Dec. 6, 2007

(51) Int. Cl.
*H04N 1/405* (2006.01)
*H04N 1/40* (2006.01)

(52) U.S. Cl. ....... 358/3.13; 358/3.16; 358/3.2; 358/3.23

(58) Field of Classification Search .................... 358/1.9, 358/3.06, 3.23, 3.3, 1.12, 1.2, 1.6, 2.99, 3.01, 358/3.11, 3.12, 3.21, 3.24, 3.13, 3.16, 3.2, 358/445

See application file for complete search history.

(56) References Cited

U.S. PATENT DOCUMENTS

| 4,149,194 | A | * | 4/1979 | Holladay | 358/3.23 |
| 5,479,263 | A | | 12/1995 | Jacobs et al. | |
| 5,867,599 | A | * | 2/1999 | Michaelis et al. | 382/237 |
| 5,949,966 | A | * | 9/1999 | Hayashi | 358/1.9 |
| 6,020,979 | A | * | 2/2000 | Zeck et al. | 358/1.9 |
| 6,793,309 | B2 | * | 9/2004 | McCay et al. | 347/15 |
| 2007/0236736 | A1 | | 10/2007 | Tai et al. | |
| 2007/0252838 | A1 | * | 11/2007 | Hains et al. | 345/467 |

* cited by examiner

*Primary Examiner* — James A Thompson
(74) *Attorney, Agent, or Firm* — Pillsbury Winthrop Shaw Pittman LLP

(57) ABSTRACT

A preferred embodiment reproduces an image by receiving an input contone array of M contone data values. The contone data values may lie within a range from 1 to N. The embodiment includes comparing each contone data value to an array of M sets of pattern look-up tables to generate an array of M pattern values. M may be a number of one or more. Each pattern value in the array of M pattern values may be decoded to a corresponding K by L multi-pixel pattern of binary data. The binary data is rendered by a reprographic device.

20 Claims, 4 Drawing Sheets

SYSTEM AND METHOD FOR PATTERNED ENCODED HALFTONING

The present application relates generally to digital document production equipment.

BACKGROUND

Digital printers commonly provide a limited number of output possibilities, and are commonly binary, i.e., they produce either a dot or no dot at a given pixel location. Thus, given a color separation with 256 shades of a subtractive primary color, a set of binary printer signals is produced to approximate the continuous tone (contone) effect. This process is referred to as halftoning.

In such arrangements, over a given area and the separation having a number of contone pixels therein, each pixel value of an array of contone pixels within the area is compared to one of a set of preselected thresholds (the thresholds may be stored as a dither matrix and the repetitive pattern generated by this matrix is considered a halftone cell) as taught for example in U.S. Pat. No. 4,149,194 to Holladay, the entirety of which is incorporated herein by reference. The effect of such an arrangement is that, for an area where the image is a contone, some of the thresholds in the matrix will be exceeded, i.e., the image value at that specific location is larger than the value stored in the dither matrix for that same location, while others are not.

In the binary case, the pixels or cell elements for which the thresholds are exceeded might be printed as black or some color, while the remaining elements are allowed to remain white or uncolored, dependent on the actual physical quantity described by the data. Since the human visual system tends to average out rapidly varying spatial patterns and perceives only a spatial average of the micro-variation in spot-color produced by a printer, the halftone process described above can be used to produce a close approximation to the desired color in the contone input.

Generally, the resulting binary data is at a higher resolution relative to the input contone data. For example, an iGen3® printer made by Xerox® Corporation may receive 600×600×8 contone data from the controller and send a 4800×600×1 binary (halftoned) data to the raster output scanner (ROS). Other model engines also may expect 600×600×8 data, and the halftoning modules produce 2400×2400×1 binary patterns.

The dither matrix of threshold values is often referred to as a Holladay halftone dot or "screen," and the process of generating the binary image from the contone image using the screen is called halftoning or "screening."

Halftone screens are typically two-dimensional threshold arrays and are relatively small in comparison to the overall image or document to be printed. Therefore, the screening process uses an identical halftone screen repeated for each color separation in a manner similar to tiling. The output of the screening process, using a single-cell halftone dot, includes a binary pattern of multiple small arrays (i.e., "dots"), which are regularly spaced, and is determined by the size and the shape of the halftone screen. In other words, the screening output, as a two-dimensionally repeated pattern, possesses at least two fundamental spatial frequencies, which are completely defined by the geometry of the halftone screen.

Color printers, due to memory constraints, often have only a few preconfigured screens. A printer controller may have the capability to change between these screens at a page boundary or within a page on an object-tag basis. However, the controller cannot configure the engine to use a different screen that may be more appropriate for a particular application. Thus, the user is limited to use the predefined image screens, even though another screen (not predefined) may be more appropriate for the imaging application. As a result, the image rendering may be sub-optimal.

SUMMARY

A preferred embodiment reproduces an image by receiving an input contone array of M contone data values. The contone data values may lie within a range from 1 to N. The embodiment includes comparing each contone data value to an array of M sets of pattern look-up tables to generate an array of M pattern values. M may be a number of one or more. Each pattern value in the array of M pattern values may be decoded to a corresponding K by L multi-pixel pattern of binary data. The binary data is rendered by a reprographic device.

DETAILED DESCRIPTION

An embodiment described below provides a super-resolution encoded (SRE)halftoning system having super-resolution encoding (SRE)/decoding (SRD)capabilities to allow a user to bypass the pre-programmed screens of a printer and achieve the desired image rendering. In particular, a preferred embodiment provides an SRE halftoning engine and SRD module that enables conventional SRE codes to be used in a novel way as building blocks for construction of binary halftone patterns. The SRE halftoning engine utilizes the SRE dot disclosed in co-pending patent application Ser. No. 11/443,016, entitled "System and Method for Creating Patterned Encoded Halftones," by J. McElvain et al. filed on May 31, 2006, herewith, which is incorporated herein by reference in its entirety.

Figure 1:
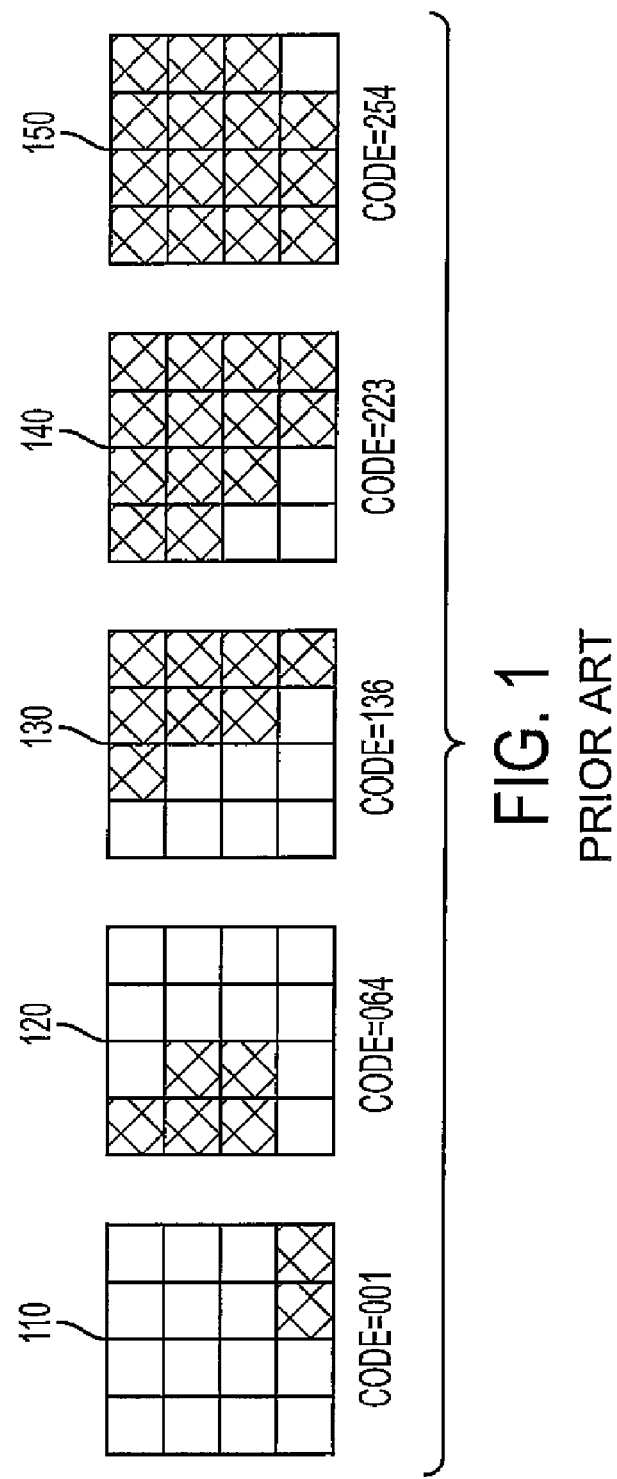
FIG. 1 shows exemplary, conventional SRE codes.

For an 8-bit code specification, there are as many as 256 unique SRE codes, each of which result in a different 3 by 3 bit pattern to be rendered. FIG. 1 shows a few exemplary SRE codes. Pattern 110 represents an SRE code of "001." Similarly, patterns 120, 130, 140 and 150 represent the SRE codes of "064," "136," "223," and "254," respectively. Although the codes can refer to a 4×4 bit pattern on one particular marking device, on other devices these codes may include various sizes or dimensions, such as 2×2 or 1×8. Conventionally, SRE patterns have been used in printers with SRE/SRD capabilities to improve rendering of edges and corners when used in conjunction with techniques such as anti-aliasing. During implementation, a printer with SRE/SRD capabilities would recognize an edge or corner of an image to be reproduced and select one of the SRE patterns for image rendering most similar to the edge to be rendered. For example, at an edge of an image that contains a diagonal line, a conventional printer with SRE/SRD capabilities may select pattern 130, which represents SRE code 136.

The exemplary embodiment describes a method for providing 2400×2400 rendering using a 600×600 SRE halftone description to enable printing of SRE halftones on engines that support SRE/SRD. However, the techniques described herein may be applied in other contexts. For example, a library of other multipixel patterns having a different pattern size of conventional SRE/SRD codes may be used in accordance with the techniques disclosed herein.

As described above, a preferred embodiment enables SRE patterns to be used as building blocks for 2400 dpi halftone construction, whose growth characteristics are similar to traditional halftones specified at higher resolutions. In particular, the preferred embodiment utilizes a new SRE halftone dot description, defined in co-pending patent application Ser. No. 11/443,016, entitled "System and Method for Creating Patterned Encoded Halftones," by J. McElvain et al. filed on May 31, 2006 herewith, for halftoning in a manner analogous to Holladay threshold based design.

Figure 2:
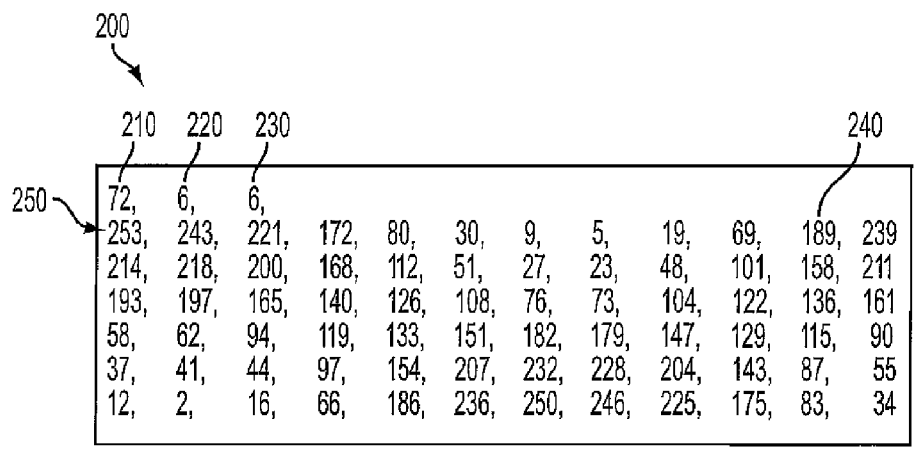
FIG. 2 shows a conventional Holladay dot.

FIG. 2 shows an exemplary Holladay dot. As shown in FIG. 2, the size field or number of elements 210 in a Holladay dot 200 is 72. A height field 220 of Holladay dot 200 is 6, indicating the dot has 6 rows. Indeed, in this example, Holladay dot 200 has a matrix of elements 250 that is 6 rows by 12 columns, giving it a size of 72 elements as shown in size field 210. Shift field 230 indicates the amount to offset a Holladay dot (sometimes called a "brick") at subsequent rows. A Holladay brick is placed across a page for each corresponding sub-array of pixels of contone data, similar to tiling. In this example, shift field 230 has a value of 6, indicating that the second row of Holladay bricks will be shifted 6 units to the left from the beginning of the first row.

Matrix of elements 250 determines the pattern of small dots to represent each incoming corresponding group of pixels of the contone image. Each element 240 is a predetermined threshold level that will be compared with the contone data to determine whether a corresponding dot should be printed.

Figure 3:
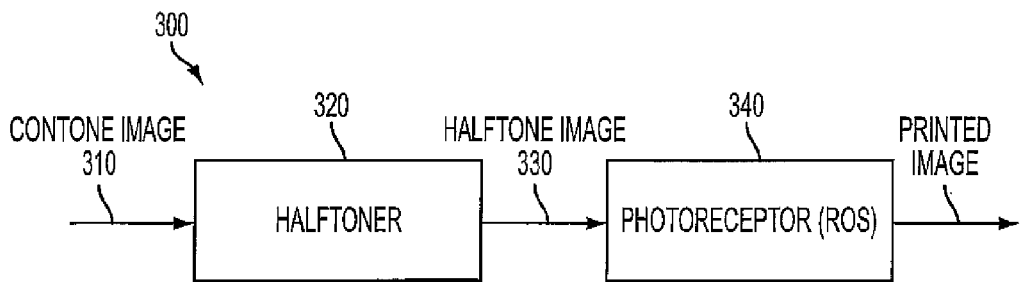
FIG. 3 illustrates a conventional system using a Holladay dot for screening.

FIG. 3 illustrates a conventional system using a Holladay dot for screening. System 300 includes an input contone image 310. Contone image 310 includes 600×600×8 contone data. Thus, each pixel of contone image 310 is an 8-bit data unit, representing a gray level from 0-255. However, one of ordinary skill in the art will appreciate that contone image 310 may include data of any size or dimensions.

Halftoner 320 renders intensity or lightness levels by converting the incoming continuous tone image 310 to a halftone image 330. A halftone representation is an approximation of an original image that uses a series of carefully placed dots to create an appearance of continuous tones when viewed from a normal viewing distance. The halftone data is written as binary patterns (dot/no dot) onto a photoreceptor 340 of a printer, such as a production level color xerographic printer. The resulting halftoned image has a binary pattern at a higher resolution than the contone data.

Halftoner 320 uses a particular Holladay dot for rendering the halftone data. For example, upon receipt of an 8-bit pixel of contone data having a gray level of "37," halftoner 320 compares the raw data to each element 240 within matrix 250 of Holladay dot 200 and writes a pattern to photoreceptor 340 accordingly. In particular, halftoner 320 prints a dot at each pixel that threshold level 240 gray level "37" exceeds and would not print a dot (e.g., leave paper uncolored) at each pixel that threshold level 240 gray level "37" does not exceed.

Referring to FIG. 2 for a gray level of "37," halftoner 320 would not place a dot (e.g., leave paper uncolored) at the first element 240, because gray-level "37" does not exceed the threshold level 253 of that element. Continuing along the first row of Holladay dot 200, dots would not be placed until reaching the sixth element, which has a value of 30 (e.g., 37>30). Likewise, a dot would be placed at elements 240 having threshold levels of 9, 5, and 19, respectively, but would not be placed for the last three elements of the row having threshold levels of 69, 189 and 239.

Dots are printed for each row of matrix 250 based upon a comparison of the threshold values to the gray level as described above, thereby producing a brick (e.g., halftoned data) for the gray-level "37."

Figure 4:
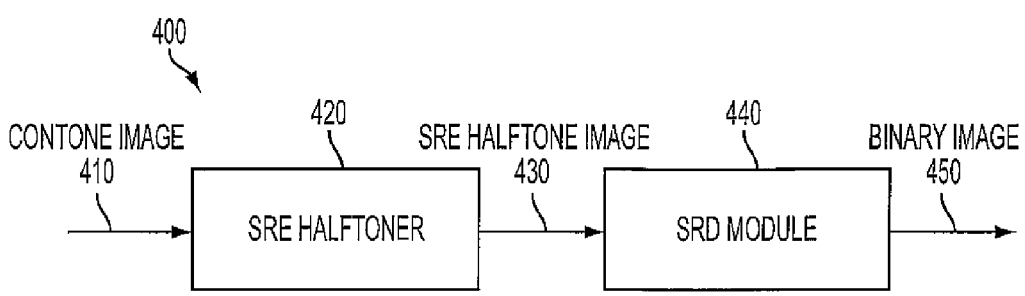
FIG. 4 illustrates an SRE halftoning system, in accordance with a preferred embodiment.

FIG. 4 illustrates an SRE halftoning system, in accordance with a preferred embodiment. SRE halftoning system 400 includes an SRE halftoner 420 and an SRD module 440. SRE halftoner 420 uses an SRE dot constructed based upon a desired Holladay dot, such as Holladay dot 200, for encoding a contone image into an SRE halftoned image 430. In a preferred embodiment SRE halftoned image 430 has the same dimensions as the original contone data 410. SRD module 440 decodes the SRE halftoned image 430 into binary image 450. Binary data (dot/no dot) 450 is sent to a photoreceptor, such as photoreceptor 340.

Figure 5:
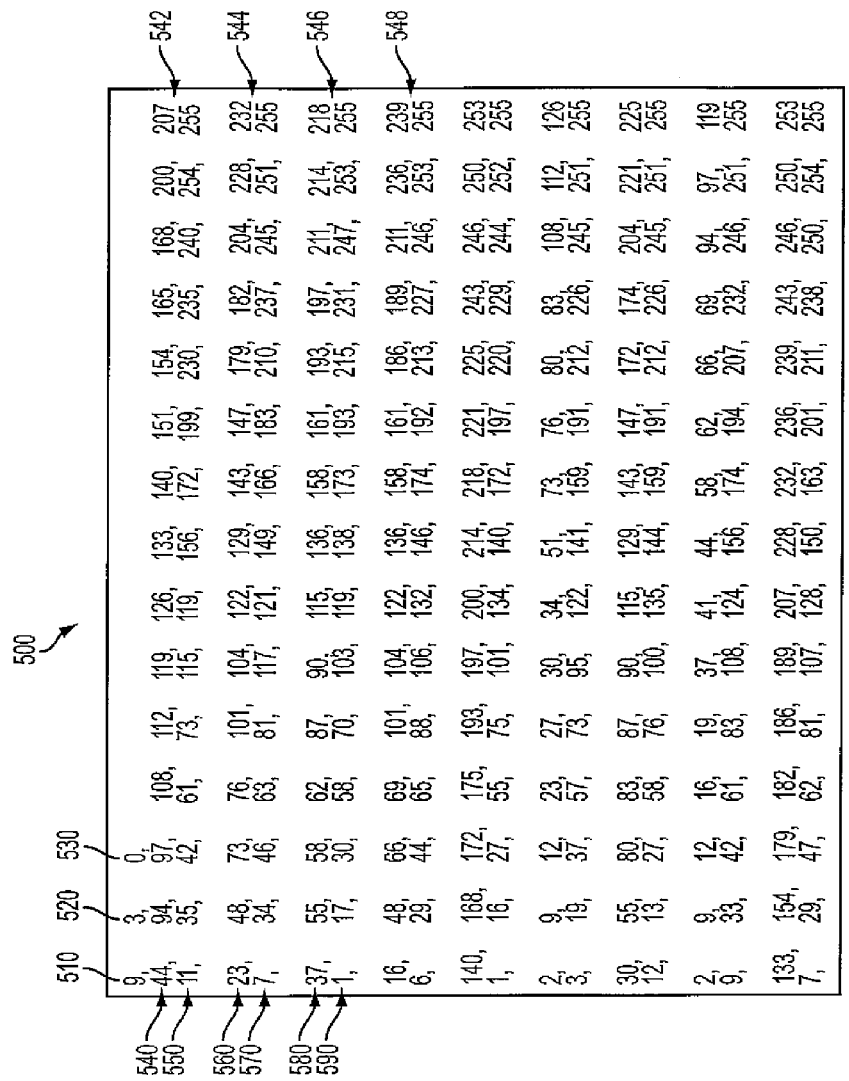
FIG. 5 illustrates an exemplary SRE dot based upon a Holladay dot, in accordance with a preferred embodiment.

FIG. 5 illustrates an exemplary SRE dot based upon Holladay dot 200, in accordance with a preferred embodiment. SRE dot 500 has a size field 510 of "9," a height field 520 of "3," and a shift field 530 of "0." Size field 510 indicates that SRE dot 500 has 9 SRE pixels. Similarly, height field 520 indicates that SRE dot 500 has 3 rows. A value of "0" in shift field 530 indicates that SRE dot 500 is not shifted to the left by any amount on a subsequent row, as SRE bricks are placed across a page and onto subsequent rows in a manner similar to tiling.

A list of thresholds 540 and a list of corresponding SRE codes 550 associated with the thresholds is provided for each of the 9 pixels of SRE dot 500. For each SRE pixel, a list of threshold values 540 and corresponding SRE codes 550 is created to represent Holladay dot 200. For example, threshold values/SRE codes for an upper left pixel of SRE dot 500 is provided at 542. Similarly, threshold values/SRE codes for an upper center pixel of SRE dot 500 is provided at 544. Array 546 corresponds to an upper right pixel of SRE dot 500, and array 548 corresponds to the center left pixel of replicated SRE dot 500.

One of ordinary skill in the art will appreciate that the system is not limited to any particular arrangement of pixels within SRE dot 500.

Figure 6:
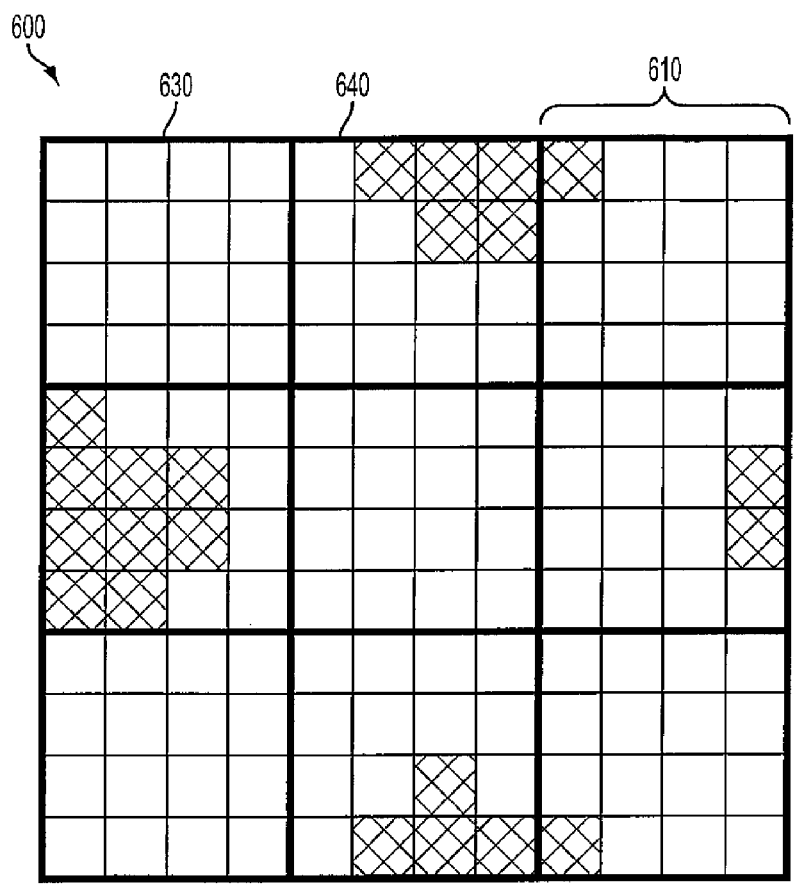
FIG. 6 shows an exemplary operation of an SRE halftoning system on a single contone data value, in accordance with a preferred embodiment.

FIG. 6 shows an exemplary operation of an SRE halftoning system on a single contone data value, in accordance with a preferred embodiment. Each block 610 represents an SRE pixel (e.g., 542, 544, 546) of SRE dot 500. Further, each block 610 contains an output of binary data (dot/no dot) 450 from the SRD module 440 in accordance for a particular SRE code selected by the SRE halftoning module. Dot 600 shows binary data schematically illustrated for a contone level of "37."

For example, referring to FIG. 5 at pixel 542, row 540 of contone levels does not have an entry "37" or below. Thus, the SRE code for pixel 542 is "0." As shown in FIG. 6, block 630 shows SRE code "0" decoded by SRD module as binary data. No dots have been placed in block 630.

Referring to pixel 544, a comparison of the input contone data level "37" to a row of contone levels 560 shows that "37" is greater than "23," but less than the next level of "48." Thus, a level of "23" is selected and the corresponding SRE code in the list of threshold values 570 is "7." The SRE code of 7 is selected by the SRE halftoner and placed in an encoded array of pattern values for the contone level of "37." The SRD module receives the encoded array and decodes each encoded pattern code into a pattern of binary data. Pixel 640 illustrates the decoding of SRE code "7" by the SRD module.

Similarly, referring to pixel 546, an SRE halftoner compares input contone data level "37" to a row of contone levels 580 and selects the first element in the array, which is "37." The corresponding SRE code shown in the list of threshold values 590 is "1." The SRE code of 1 is selected by the SRE halftoner and placed in an encoded array of pattern values for the contone level of "37." In this example, there are 9 encoded pattern values for a contone level. SRD module receives the encoded array and decodes each encoded pattern code into a pattern of binary data. Pixel 610 illustrates the decoding of SRE code "1" by the SRD module.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for reproducing an image in super resolution, comprising:
    receiving an input contone array of M contone data values, the contone data values being within a range from 1 to N;
    comparing each contone data value to an array of M sets of pattern look-up tables to generate an array of M pattern values, wherein M is one or more and the M sets of pattern look-up tables include intensity threshold levels and corresponding super resolution codes, each lookup table corresponding to a halftone screen divided into a plurality of pixels, each pixel comprising a K by L multi-pixel sub-pattern comprising a halftone pattern, wherein each super resolution code is associated with one of the K by L sub-patterns of binary data of the halftone screen;
    decoding each pattern value to corresponding K by L multi-pixel sub-patterns of binary data associated with the super-resolution codes to generate a halftone screen; and
    reproducing the binary data using the generated halftone screen.

2. The method of claim 1, wherein the K by L multi-pixel pattern is a pattern in a library of patterns.

3. The method of claim 1, wherein comparing includes identifying a threshold level the contone data level does not exceed and an associated pattern value at each set of pattern look up tables.

4. The method of claim 1, wherein the K by L multi-pixel pattern of binary data is 4 by 4.

5. The method of claim 1, wherein the K by L multi-pixel pattern of binary data is 2 by 2.

6. The method of claim 1, wherein the K by L multi-pixel pattern of binary data is 1 by 8.

7. The method of claim 1, wherein the halftone screen is a Holladay dot.

8. The method of claim 7, wherein the Holladay dot includes a size field, a height field, and a shift field.

9. The method of claim 1, wherein the input contone array corresponds to a pixel of the image.

10. A system for reproducing an image in super resolution, comprising:
    a halftoner configured to:
        receive an input contone array of M contone data values, the contone data values being within a range from 1 to N, and
        compare each contone data value to an array of M sets of pattern look-up tables to generate an array of M pattern values, wherein M is one or more and the M sets of pattern look-up tables include intensity threshold levels and corresponding super resolution codes, each lookup table corresponding to a halftone screen divided into a plurality of pixels, each pixel comprising a K by L multi-pixel sub-pattern comprising a halftone pattern, wherein each super resolution code is associated with one of the K by L sub-patterns of the halftone screen; and
    a decoder module for decoding each pattern value to corresponding K by L multi-pixel sub-patterns of binary data associated with the super-resolution codes to generate a halftone screen.

11. The system of claim 10, wherein the K by L multi-pixel pattern is a pattern in a library of patterns.

12. The system of claim 10, wherein the halftoner identifies a threshold level the contone data level does not exceed and an associated pattern value at each set of pattern look up tables.

13. The system of claim 10, wherein the K by L multi-pixel pattern of binary data is 4 by 4.

14. The system of claim 10, wherein the K by L multi-pixel pattern of binary data is 2 by 2.

15. The system of claim 10, wherein the K by L multi-pixel pattern of binary data is 1 by 8.

16. The system of claim 10, wherein the halftone screen is a Holladay dot.

17. The system of claim 16, wherein the Holladay dot includes a size field, a height field, and a shift field.

18. The system of claim 10, wherein the print engine includes a photoreceptor.

19. The system of claim 10, wherein the input contone array corresponds to a pixel of the image.

20. A computer readable media having stored thereon computer executable instructions, wherein the computer executable instructions, when executed by a computer, directs a computer to perform a method for reproducing an image in super resolution, the method comprising:
    receiving an input contone array of M contone data values, the contone data values being within a range from 1 to N;
    comparing each contone data value to an array of M sets of pattern look-up tables to generate an array of M pattern values, wherein M is one or more and the M sets of pattern look-up tables include intensity threshold levels and corresponding super resolution codes, each lookup table corresponding to a halftone screen divided into a plurality of pixels, each pixel comprising a K by L multi-pixel sub-pattern comprising a halftone pattern, wherein each super resolution code is associated with one of the K by L sub-patterns of binary data of the halftone screen; and
    decoding each pattern value to corresponding K by L multi-pixel sub-patterns of binary data associated with the super-resolution codes to generate a halftone screen; and
    reproducing the binary data using the generated halftone screen.

* * * * *